US008305617B2

(12) United States Patent
Haba

(10) Patent No.: US 8,305,617 B2
(45) Date of Patent: Nov. 6, 2012

(54) IMAGE FORMING APPARATUS CAPABLE OF PROPERLY SETTING COPY CONDITIONS OF DOCUMENT

(75) Inventor: Kenya Haba, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 590 days.

(21) Appl. No.: 12/534,887

(22) Filed: Aug. 4, 2009

(65) Prior Publication Data
US 2010/0039673 A1 Feb. 18, 2010

(30) Foreign Application Priority Data
Aug. 12, 2008 (JP) ................................. 2008-208070

(51) Int. Cl.
*G06F 15/00* (2006.01)
*G06G 21/00* (2006.01)
(52) U.S. Cl. ........................................ 358/1.15; 399/366
(58) Field of Classification Search .................. 358/1.15, 358/1.18
See application file for complete search history.

(56) References Cited

U.S. PATENT DOCUMENTS

| 7,593,542 | B2 | 9/2009 | Abe et al. | |
|---|---|---|---|---|
| 7,623,269 | B2 | 11/2009 | Higashiura | |
| 2008/0309981 | A1* | 12/2008 | Mori | 358/1.18 |

FOREIGN PATENT DOCUMENTS

| JP | 2004-258214 A | 9/2004 |
|---|---|---|
| JP | 2004-282116 | 10/2004 |
| JP | 2005-157841 | 6/2005 |
| JP | 2006-174304 | 6/2006 |
| JP | 2007-158808 | 6/2007 |
| JP | 2007-165941 | 6/2007 |
| JP | 2007-221222 | 8/2007 |
| JP | 2007-243704 A | 9/2007 |
| JP | 2007-267419 | 10/2007 |
| JP | 2007-310702 | 11/2007 |
| JP | 2008-117128 | 5/2008 |
| JP | 2008-167457 | 7/2008 |

OTHER PUBLICATIONS

Office Action (Decision to Grant Patent) dated Dec. 14, 2010, issued in the corresponding Japanese Patent Application No. 2008-208070, and an English Translation thereof.
Notice of Grounds of Rejection dated Jul. 6, 2010, issued in the corresponding Japanese Patent Application No. 2008-208070, and an English Translation thereof.

\* cited by examiner

*Primary Examiner* — Saeid Ebrahimi Dehkordy
(74) *Attorney, Agent, or Firm* — Buchanan Ingersoll & Rooney PC

(57) ABSTRACT

In an image forming apparatus outputting a document, a copy condition of the output document and the order of priority among the set copy condition, a condition on the part of the machine, and a condition input by the user to be actually decided on as a copy condition are set. The information is then embedded and output. In an image forming apparatus making a copy, the output printed material is scanned and the embedded copy condition and order of priority are extracted and restored. Then, for each item of the copy conditions, a condition having a higher priority among the aforementioned conditions is decided on as a copy condition of the printed material, so that the printed material is copied under the decided condition.

16 Claims, 10 Drawing Sheets

FIG.8

| COPY CONDITION | EMBEDDED CONDITION | MACHINE SET CONDITION | MACHINE INPUT CONDITION | USER INPUT CONDITION |
|---|---|---|---|---|
| COLOR/ BLACK-AND-WHITE | 1 | 2 | 4 | 3 |
| PAPER SIZE | 3 | 1 | 2 | 4 |
| PAPER TYPE | 4 | 1 | 2 | 3 |
| MAGNIFICATION | 1 | 2 | 4 | 3 |
| N IN 1 | 1 | 2 | 4 | 3 |
| SCAN TO *** | 1 | 2 | 4 | 3 |
| BILLING | 3 | 1 | 4 | 2 |

IMAGE FORMING APPARATUS CAPABLE OF PROPERLY SETTING COPY CONDITIONS OF DOCUMENT

This application is based on Japanese Patent Application No. 2008-208070 filed with the Japan Patent Office on Aug. 12, 2008, the entire content of which is hereby incorporated by reference.

BACKGROUND OF THE INVENTION

1. Field of the Invention

The present invention relates to an image forming apparatus and an image forming method, and more particularly to an image forming apparatus and an image forming method for forming an image having information embedded therein.

2. Description of the Related Art

Passwords and copy conditions such as restrictions on output apparatuses and designation of print modes have been embedded as background patterns in original documents. When a document having such information embedded therein is to be copied, in an image forming apparatus such as a copier, copying of the document is permitted under the embedded copy conditions as long as a password matches.

When such a technique is used, however, even though the copy conditions as described above are embedded, copying under the above-noted copy conditions may not be permitted depending on the conditions such as a state of the image forming apparatus or restriction imposed on the user.

SUMMARY OF THE INVENTION

The present invention is made in view of such a problem, and an object of the present invention is to provide an image forming apparatus and an image forming method for allowing a copy condition of a document to be set properly.

In order to achieve the aforementioned object, in accordance with an aspect of the present invention, an image forming apparatus includes: a scanner optically scanning a document to obtain image data; an output device for outputting a printed material based on the image data; an input device for accepting a first copy condition, when a printed material is output based on image data obtained by scanning a first document through the scanner, the first copy condition being a copy condition for copying the printed material as a second document, and accepting an order of priority as a copy condition of the second document between the first copy condition and a second copy condition, the second copy condition being to be specified in another image forming apparatus to make a copy of the second document; and a controller configured to control the image forming apparatus for generating a background pattern based on the first copy condition and the order of priority, and for combining the image data obtained from the first document with the background pattern. The output device outputs the image data combined with the background pattern, as the printed material.

In accordance with another aspect of the present invention, an image forming apparatus includes: a scanner optically scanning a document to obtain image data; an output device performing an image forming process based on the image data for output; and a controller configured to control the image forming apparatus for detecting a background pattern from the image data, for restoring embedded information from the background pattern, for specifying as a second copy condition a copy condition set on the part of the image forming apparatus, and obtaining, from the restored embedded information, a first copy condition set for the document as a condition in copying the document and an order of priority between the first copy condition and the second copy condition for deciding a copy condition of the document, to decide on one of the first copy condition and the second copy condition as a condition for outputting the image data in the output device, based on the order of priority.

In accordance with a further aspect of the present invention, an image forming apparatus includes: a scanner optically scanning a document to obtain image data; an output device for outputting a printed material based on the image data; an input device for accepting a first copy condition, when a printed material is output based on image data obtained by scanning a first document through the scanner, the first copy condition being a copy condition for copying the printed material as a second document, and accepting an order of priority as a copy condition of the second document between the first copy condition and a second copy condition, the second copy condition being to be specified in the image forming apparatus to make a copy of the second document; and controller configured to control the image forming apparatus for generating a background pattern based on the first copy condition and the order of priority, for combining the first image data with the background pattern, for detecting the combined background pattern from the image data obtained by the scanner, for restoring embedded information from the background pattern, for specifying a copy condition set on the part of the image forming apparatus, as the second copy condition, and for obtaining the first copy condition and the order of priority from embedded information restored from the background pattern detected from second image data obtained by the scanner by scanning the second document that is a printed material output based on the first image data combined with the background pattern, to decide on one of the first copy condition and the second copy condition as a condition for outputting the image data in the output device, based on the order of priority.

In accordance with a still further aspect of the present invention, an image forming method includes the steps of: accepting a setting of a first copy condition as a copy condition in copying a second document that is a printed material output based on image data obtained by scanning a first document; accepting a setting of an order of priority between the first copy condition and a second copy condition specified in an image forming apparatus that makes a copy of the second document, for deciding a copy condition of the second document; obtaining image data by optically scanning the first document; generating a background pattern based on the first copy condition and the order of priority; combining the image data with the background pattern; and outputting the image data combined with the background pattern.

In accordance with yet another aspect of the present invention, an image forming method includes the steps of: obtaining image data by optically scanning a document; detecting a background pattern from the image data; restoring embedded information from the background pattern to obtain a first copy condition set for the document as a condition in copying the document and an order of priority between the first copy condition and a second copy condition set on the part of the image forming apparatus for deciding a copy condition of the document; and deciding on one of the first copy condition and the second copy condition as a condition for outputting the image data, based on the order of priority.

In accordance with a further aspect of the present invention, an image forming method in a system configured to include at least one image forming apparatus includes the steps of: accepting a setting of a first copy condition as a copy condition for copying a second document that is a printed material output based on image data obtained by scanning a first document; accepting a setting of an order of priority between the first copy condition and a second copy condition specified in an image forming apparatus that makes a copy of the second document, for deciding a copy condition of the second document; obtaining first image data by optically scanning the first document; generating a background pattern based on the first copy condition and the order of priority; combining the first image data with the background pattern; outputting the first image data combined with the background pattern; obtaining second image data by optically scanning the second document that is a printed material output based on the first image data combined with the background pattern; detecting the background pattern from the second image data; restoring embedded information from the background pattern to obtain the first copy condition and the order of priority; and deciding on, as a condition for outputting the second image data, one of the first copy condition and the second copy condition set on the part of the image forming apparatus that copies the second document, based on the order of priority.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows a specific example of each item of copy conditions.

DESCRIPTION OF THE PREFERRED EMBODIMENTS

Figure 1:
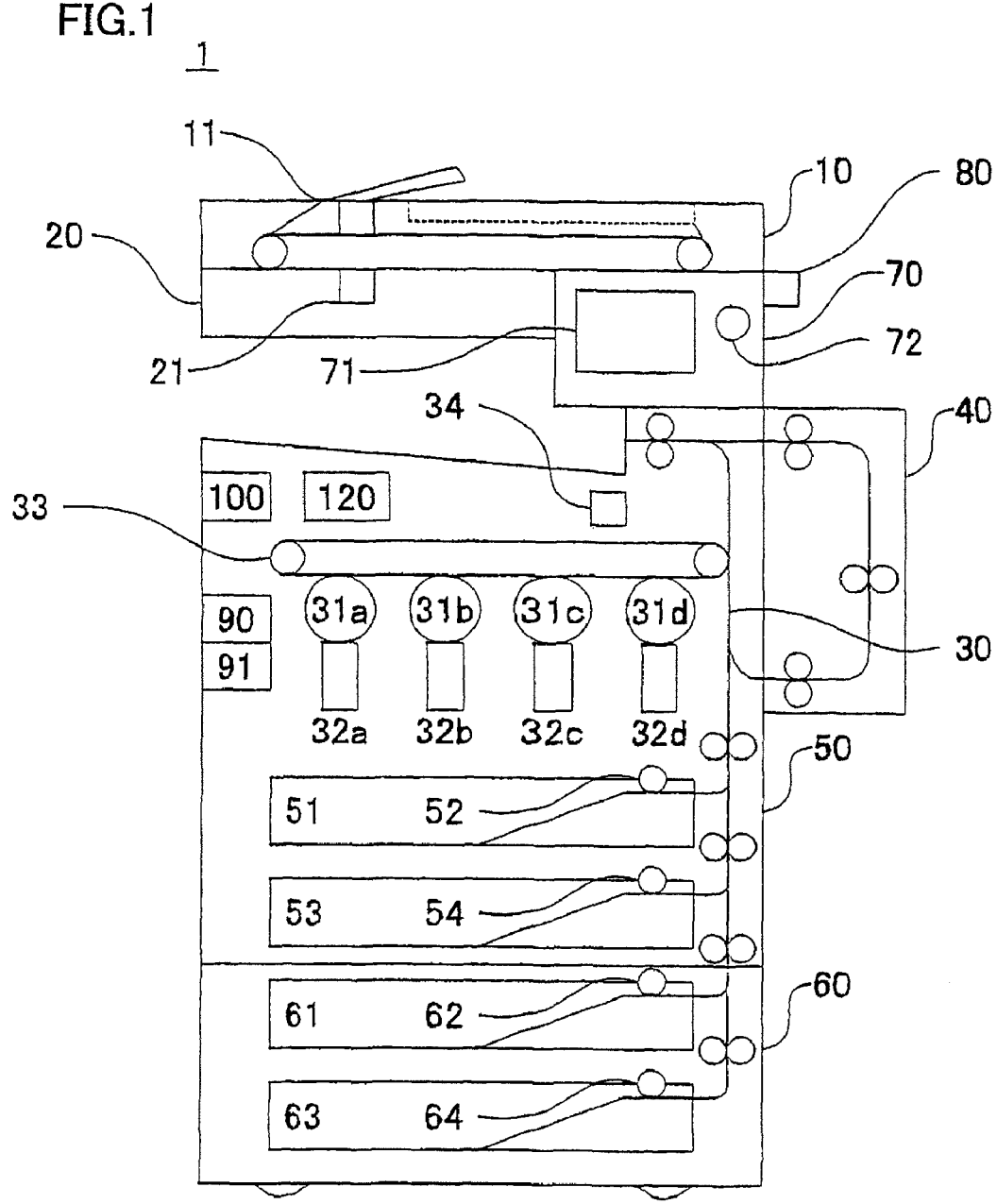
FIG. 1 is a diagram showing a specific example of an overall configuration of MFP (Multi Function Peripheral) in accordance with an embodiment.

In the following, an embodiment of the present invention will be described with reference to the drawings. In the following description, the same parts and components are denoted with the same reference characters. Their designations and functions are also the same.

Referring to FIG. 1, MFP 1 in accordance with an embodiment includes an automatic document feeder 10, a scan unit 20 for scanning a document, a formation unit 30 for forming an image, an automatic duplex unit 40, a paper-feeding unit 50, a paper-feeding cabinet 60, an operation panel 70, a facsimile unit 90, a communication interface (I/F) unit 91, a control unit 100, and an HDD (Hard Disk Drive) 120.

Automatic document feeder 10 automatically transfers a plurality of original documents set on a document feeding tray one by one to a prescribed document scanning position set on a platen glass included in scan unit 20. Automatic document feeder 10 includes a document set sensor 11. Document set sensor 11 includes a tactile switch to detect whether or not a document is set on the document feeding tray and output a signal indicative of the result to control unit 100. The document scanned by scan unit 20 is discharged onto a document receiving tray.

Scan unit 20 scans a document image according to the size of the document arranged at the document scanning position on the platen glass. Scan unit 20 converts reflected light obtained by scanning the surface of the document image into an electrical signal thereby obtaining image data. The obtained image data is input to control unit 100. Scan unit 20 includes an apparatus lift sensor 21. Apparatus lift sensor 21 includes a magnetic sensor. Scan unit 20 detects whether or not automatic document feeder 10 is lifted and outputs a signal indicative of the result to control unit 100, The configuration and operation used in usual image forming apparatuses may be employed as those of automatic document feeder 10 and scan unit 20.

Operation panel 70 is a user interface. Operation panel 70 includes a touch panel 71 and keys 72 as described later.

Control unit 100 includes a CPU 101 (FIG. 2, FIG. 3) as described later. Control unit 100 executes a prescribed program and outputs a control signal to each unit to perform the processing as follows. Specifically, control unit 100 performs a variety of data processing such as shading correction on image data input from scan unit 20. Control unit 100 thereafter reads image data for each main scanning line in synchronization with feeding of printing paper. Control unit 100 then outputs a signal for driving a laser diode based on the data in synchronization with feeding of printing paper. Control unit 100 also outputs image data to HDD 120 for storage. HDD 120 stores the image data sent from control unit 100.

Facsimile unit 90 is an interface connecting to a public telephone line for receiving/sending image data. Communication I/F unit 91 is an interface for connecting to an external network to which a personal computer etc. is connected. The external network includes, for example, a LAN (Local Area Network) and a USB (Universal Serial Bus).

Formation unit 30 forms a color image by electrophotography. Formation unit 30 includes photosensitive drums 31a, 31b, 31c, 31d (representatively referred to as photosensitive drum 31) and exposure scanning units 32a, 32b, 32c, 32d (representatively referred to as exposure scan unit 32) corresponding to yellow, magenta, cyan, and black, respectively, a transfer belt 33, a not-shown front door cover protecting these units, and a front door sensor 34.

Photosensitive drum 31 is scanned and exposed with laser light generated by exposure scanning unit 32 based on a drive signal from control unit 100. Front door sensor 34 includes a tactile switch. Front door sensor 34 detects whether or not the front door cover is opened to output a signal indicative of the result to control unit 100. Transfer belt 33 overlays all the toner images on photosensitive drum 31 corresponding to the respective colors and then transfers the overlaid images onto paper sent from paper-feeding unit 50.

Paper-feeding unit 50 includes paper-feeding cassettes 51, 53 for storing paper and pick-up rollers 52, 54 for letting out paper from each of paper-feeding cassettes 51, 53 in order to supply formation unit 30 with paper.

Paper-feeding cabinet 60 includes, similarly to paper-feeding unit 50, paper-feeding cassettes 61, 63 for storing paper and pick-up rollers 62, 64 for letting out paper from each of paper-feeding cassettes 61, 63 to supply paper to formation unit 30 through paper-feeding unit 50.

Automatic duplex unit 40 sends back single-sided printed paper on a paper sending path and feeds the paper again in order to reverse the paper. The operation of automatic duplex unit 40 enables duplex printing.

Figure 2:
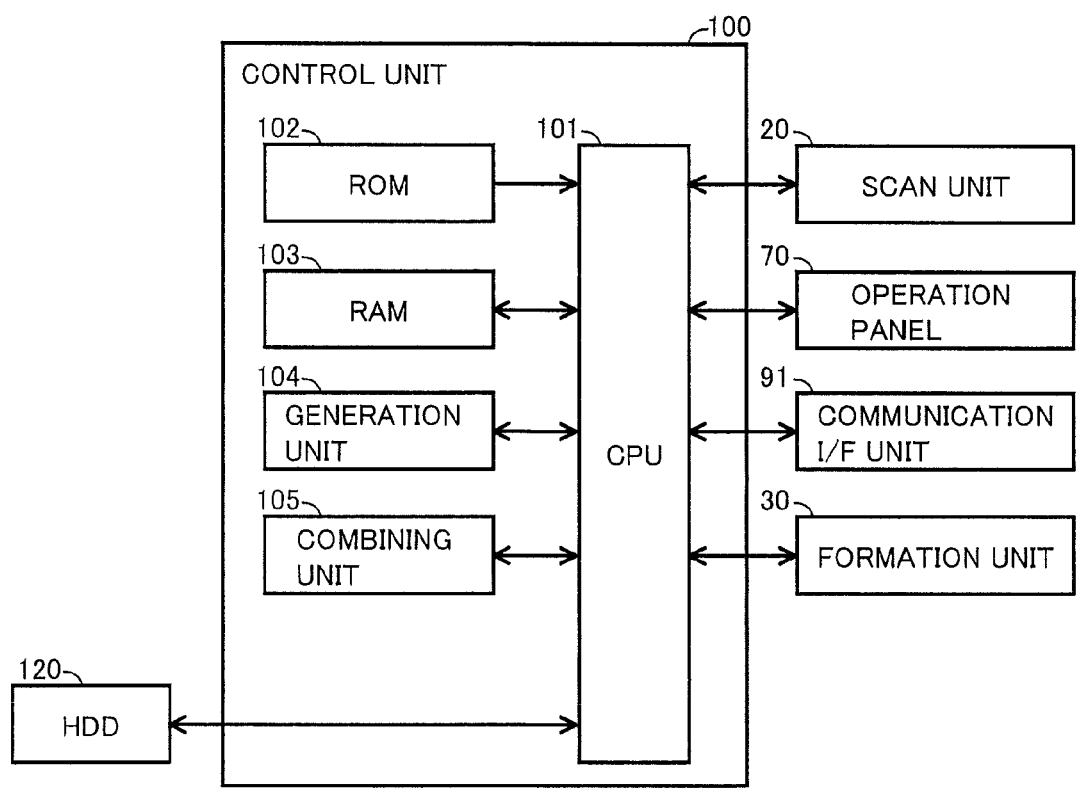
FIG. 2 is a block diagram showing a specific example of a configuration of a control unit for realizing a function of printing a document in MFP.

The configuration for realizing the function of printing a document in MFP 1 as shown in FIG. 2 is mainly formed in CPU 101 by CPU 101 included in control unit 100 reading and executing a program. Alternatively, the configuration may be formed by a hardware configuration included in control unit 100. Alternatively, the configuration may be formed by a combination thereof.

Referring to FIG. 2, in order to realize the function of printing a document in MFP 1, control unit 100 includes CPU 101, a ROM (Read Only Memory) 102, a RAM (Random Access Memory) 103, a generation unit 104, and a combining unit 105.

CPU 101 is connected to scan unit 20, operation panel 70, communication I/F unit 91, formation unit 30, and HDD 120.

Generation unit 104 and combining unit 105 execute a process for embedding a background pattern in a document in MFP 1. More specifically, generation unit 104 converts information to be embedded set and input through operation panel 70 and received from CPU 101, into a background pattern for output to CPU 101. Alternatively, CPU 101 may accept the information to be embedded received from another apparatus through communication I/F unit 91 and outputs the same to generation unit 104. In this case, generation unit 104 converts the information to be embedded received from another apparatus into a background pattern. The specifics of the information to be embedded will be described later using a screen for setting and inputting the information to be embedded.

Combining unit 105 accepts image data input from scan unit 20 and a background pattern from CPU 101 and combines these images for output to CPU 101. Alternatively, CPU 101 may accept image data received from another apparatus through communication I/F unit 91 and output the same to combining unit 105. In this case, combining unit 105 combines the image data received from another apparatus with a background pattern. The combined image data is sent from CPU 101 to formation unit 30 or a not-shown external memory.

Figure 3:
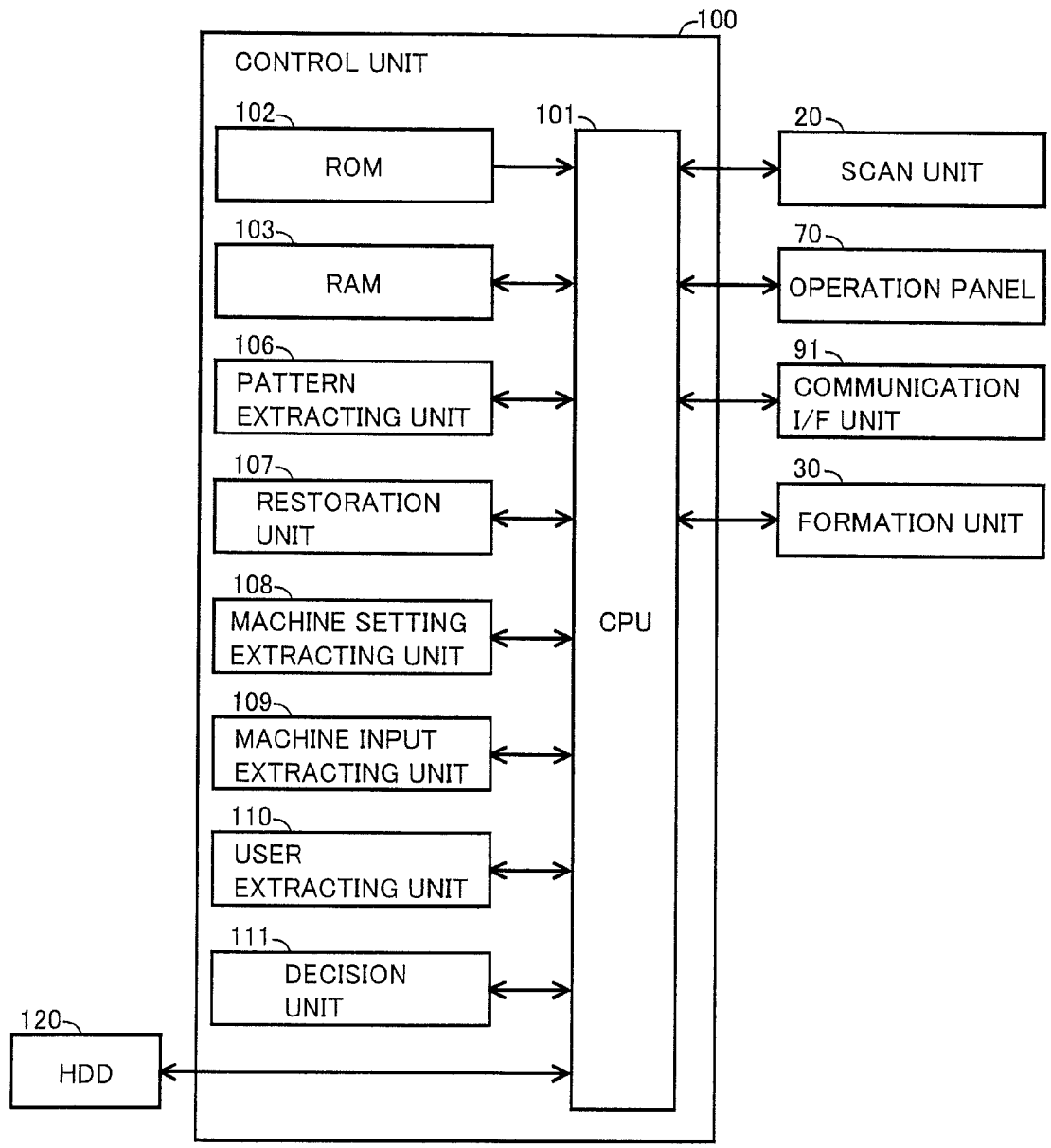
FIG. 3 is a block diagram showing a specific example of a configuration of the control unit for realizing a function of duplicating a document in MFP.

The configuration for realizing a function of duplicating a document in MFP 1 as shown in FIG. 3 is also mainly formed in CPU 101 by CPU 101 included in control unit 100 reading and executing a program. Alternatively, the configuration may be formed by a hardware configuration included in control unit 100. Alternatively, the configuration may be formed by a combination thereof.

Referring to FIG. 3, in order to realize the function of duplicating a document in MFP 1, control unit 100 includes CPU 101, ROM 102, RAM 103, a pattern extracting unit 106, a restoration unit 107, a machine setting extracting unit 108, a machine input extracting unit 109, a user extracting unit 110, and a decision unit 111.

CPU 101 is connected to scan unit 20, operation panel 70, communication I/F unit 91, formation unit 30, and HDD 120.

Pattern extracting unit 106, restoration unit 107, machine setting extracting unit 108, machine input extracting unit 109, user extracting unit 110, and decision unit 111 execute a process for scanning and duplicating a document having a background pattern embedded therein, in MFP 1. Specifically, pattern extracting unit 106 accepts from CPU 101 image data obtained by scanning a document from scan unit 20, extracts a background pattern from the image data, and outputs the extracted background pattern to CPU 101. Restoration unit 107 accepts the background pattern from CPU 101 and restores the embedded information including a copy condition and rank information as described later for output to CPU 101. Machine setting extracting unit 108 specifies and extracts information such as machine settings and function limitations due to a machine trouble from a memory in CPU 101 or HDD 120 and outputs the same to CPU 101. Machine input extracting unit 109 accepts from CPU 101 operation signals input from operation panel 70, specifies and extracts information set and input by the user from among the operation signals, and then outputs the information to CPU 101. User extracting unit 110 obtains from CPU 101 information specifying the user who is currently logging in, specifies and extracts a condition of function limitation of the user account from HDD or the like for output to CPU 101. Decision unit 111 obtains the extracted condition and the restored rank information from CPU 101 and decides a copy condition based on them for output to CPU 101. CPU 101 generates a control signal for copying under the decided condition and outputs the control signal to formation unit 30.

Figure 4:
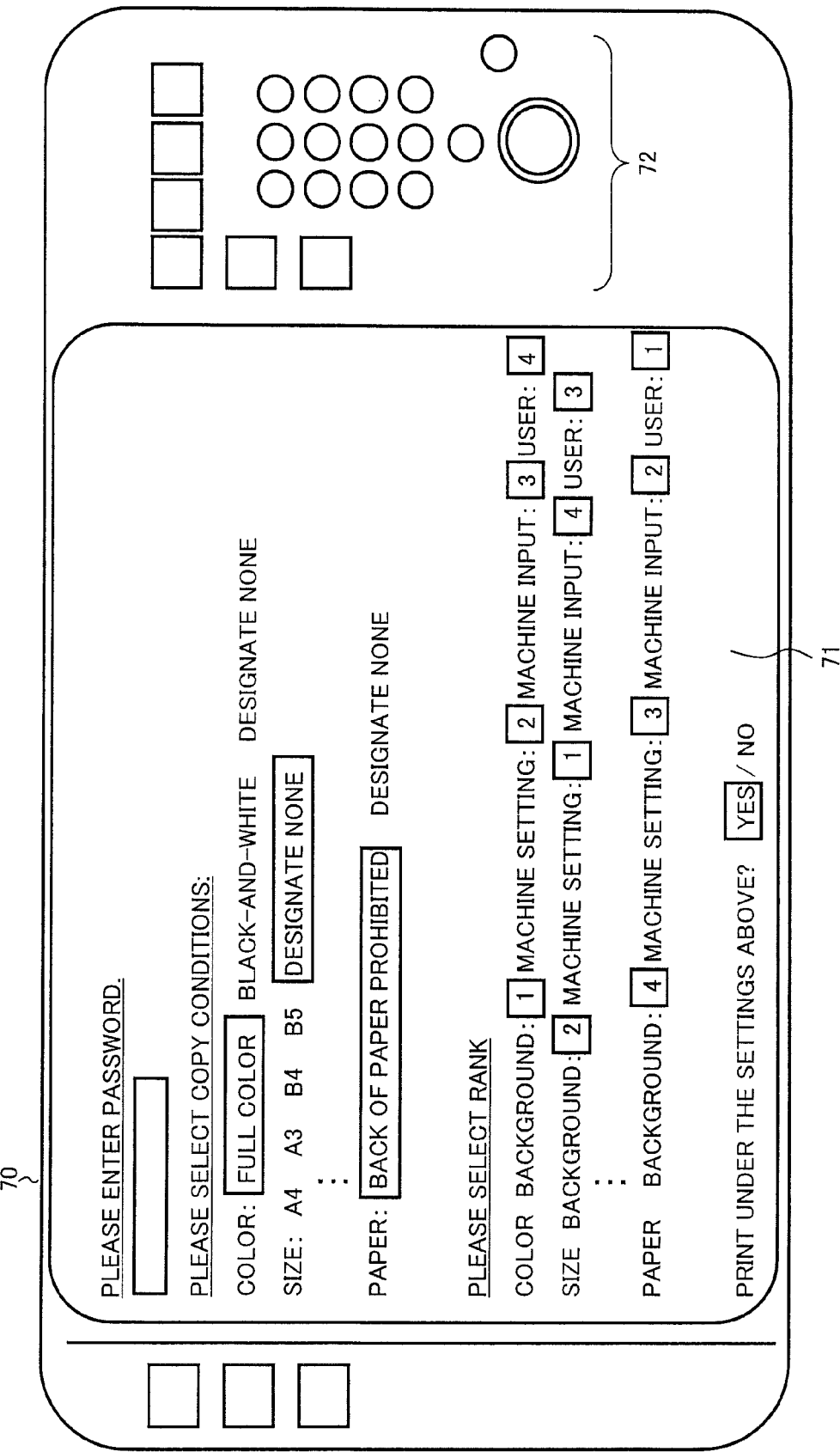
FIG. 4 shows a specific example of a screen for setting and inputting embedded information that is embedded in a document as a background pattern in MFP.

Referring to FIG. 4, operation panel 70 includes touch panel 71 and keys 72. Touch panel 71 also functions as a display for displaying a screen for inputting settings. Keys 72 accept setting inputs. Touch panel 71 additionally functions as an input device for accepting setting inputs.

According to the screen shown in FIG. 4, a password, copy conditions, and rank conditions are input as information to be embedded. The copy conditions are output conditions in copying a document having the embedded information and includes such items as a color setting, a size setting, and a paper type setting. The rank information indicates, for each of items set as the copy conditions above, the order of priority as to which of the following conditions precedes over the others in deciding the copy conditions when copying: the copy condition embedded in a document as a background pattern ("embedded condition" hereinafter); the copy condition according to the state of the apparatus that produces a copy of the document ("machine set condition" hereinafter); the copy condition set and input to the copying apparatus by the user who makes a copy ("machine input condition" hereinafter); and the copy condition set for the user under the user account of the user who makes a copy ("user condition" hereinafter). When the information to be embedded including such information is input, an operation signal indicating the information is output from operation panel 70 to CPU 101. Accordingly, the information is converted into a background pattern in generation unit 104 and embedded in target image data in combining unit 105. It is noted that the items of the copy conditions in FIG. 4 are shown by way of example. The other copy conditions may be magnification, the number of pages printed in one sheet (N in 1), the condition of saving the scanned image data into a storage device such as HDD 120 or an external memory, and the like. As shown in FIG. 4, the priority may not be set for all the items, or an item having no priority set may be included. The password is not essential. FIG. 8 shows an example of input rank information.

Figure 5:
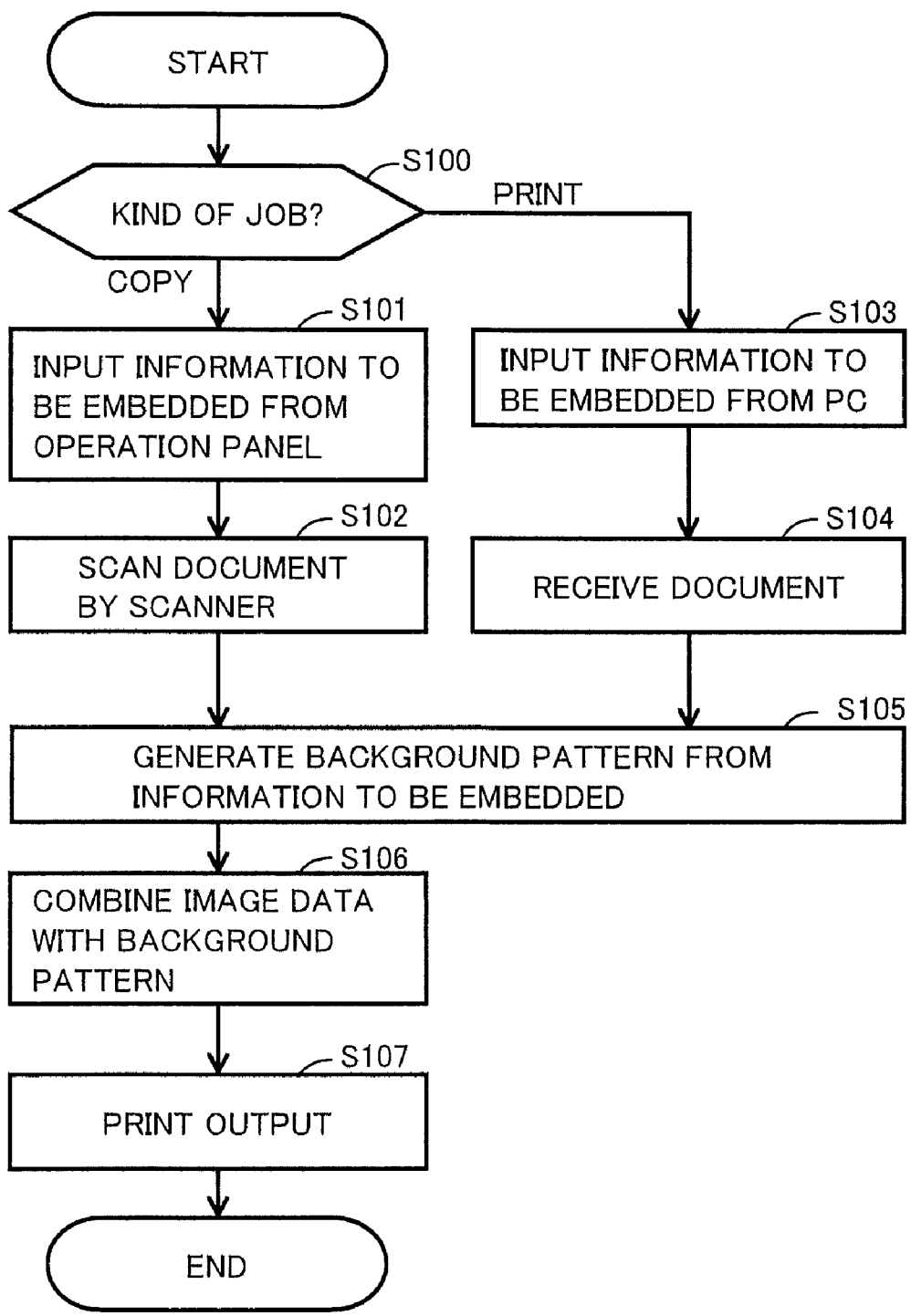
FIG. 5 is a flowchart showing a specific example of a control operation in the control unit when a document is printed in MFP.

The process in printing a document in MFP 1 as shown in the flowchart in FIG. 5 is realized by CPU 101 of control unit 100 reading and executing a program stored in ROM 102 or the like and outputting a control signal to each unit shown in FIG. 2 to allow each unit to function.

Referring to FIG. 5, CPU 101 analyzes an operation signal from operation panel 70 and specifies the kind of job. When it is specified that a copy job is designated from operation panel 70 ("copy" in step S100), in step S101, CPU 101 displays a screen for inputting settings shown in FIG. 4 on touch panel 71 of operation panel 70 and accepts inputs of information to be embedded including a password, copy conditions, and rank information. In step S102, CPU 101 generates a control signal for scanning the set document, according to the operation signal from operation panel 70, and outputs the control signal to scan unit 20. Accordingly, CPU 101 receives from scan unit 20 the image data obtained by scanning the document image.

When it is specified that a print job is designated from operation panel 70 ("print" in step S100), in step S103, CPU 101 receives, from a personal computer connected to a network through communication I/F unit 91, the information to be embedded input according to the print setting screen of the personal computer. In step S104, CPU 101 receives a target image transmitted from the personal computer.

In step S105, generation unit 104 generates a background pattern by converting the information received by CPU 101 in step S101 or step S103 into a background pattern. A method of generating a background pattern in step S105 is not limited to any particular method, and any generation method as generally performed is employed. In step S106, combining unit 105 combines the background pattern generated in step S105 with the image data obtained by scanning a document in step S102 or the image data received in step S104. In step S107, CPU 101 generates and outputs a control signal for executing printing to formation unit 30. Accordingly, formation unit 30 prints and outputs the image data combined with the embedded information in step S106.

Figure 6:
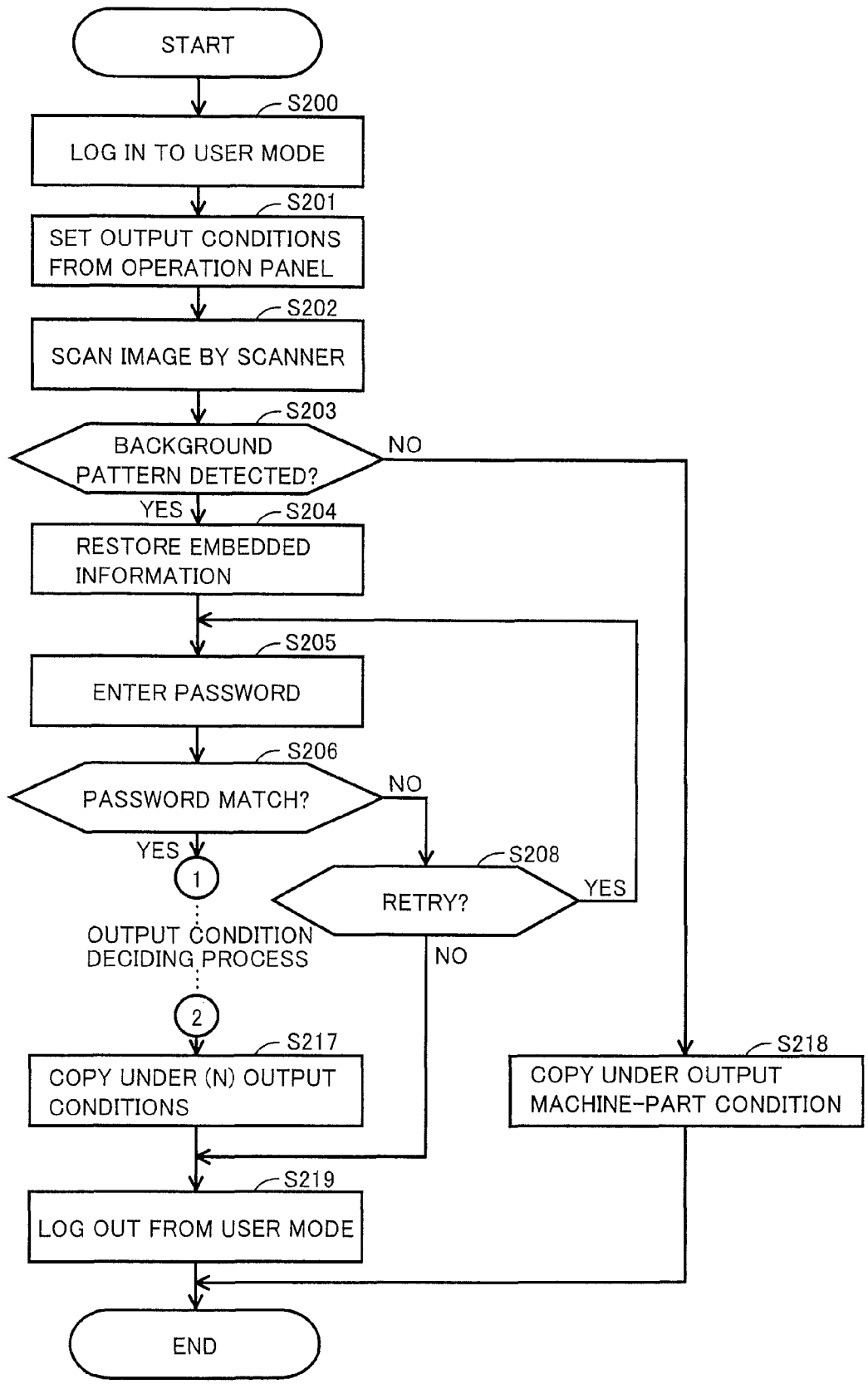
FIG. 6 is a flowchart showing a specific example of a control operation in the control unit when a document is duplicated in MFP.
Figure 7:
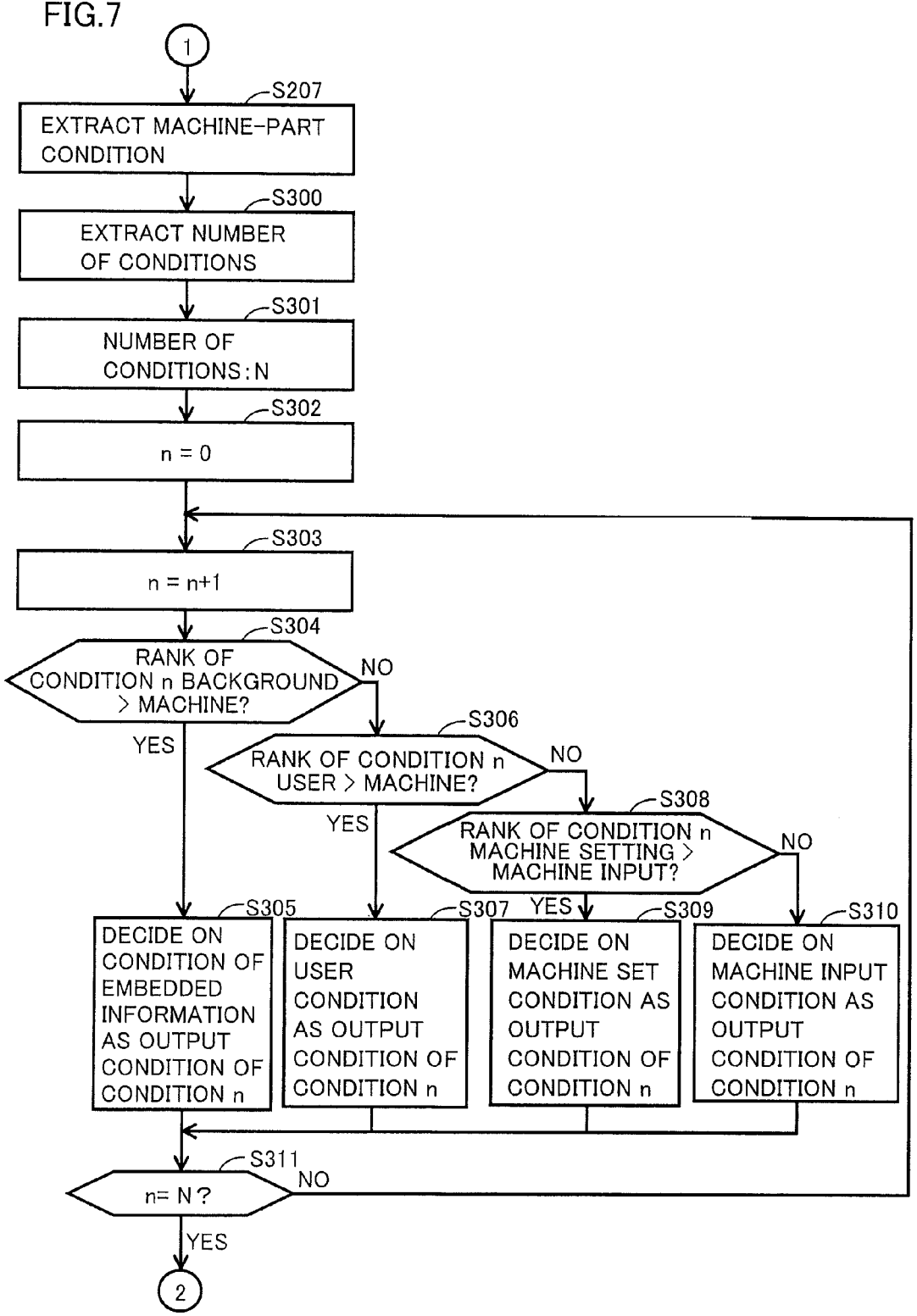
FIG. 7 is a flowchart showing a specific example of a control operation in the control unit when a document is copied in MFP.

The process in duplicating a document that is printed in the foregoing manner in MFP 1 as shown in FIG. 6 and FIG. 7 is realized by CPU 101 of control unit 100 reading and executing a program stored in ROM 102 or the like and outputting a control signal to each unit shown in FIG. 3 for allowing each unit to function.

Referring to FIG. 6, control unit 100 performs an authentication process using a not-shown authentication unit based on the log-in information input from operation panel 70. As a result of this process, if the authentication is successful, in step S200, CPU 101 logs in to the user mode. In step S201, CPU 101 accepts inputs of copy conditions from touch panel 71 of operation panel 70. In step S202, CPU 101 generates a control signal for scanning the set document according to a control signal from operation panel 70 and outputs the control signal to scan unit 20. Accordingly, CPU 101 receives the image data obtained by scanning a document image from scan unit 20.

When pattern extracting unit 106 detects a background pattern from the image data (YES in step S203), in step S204, restoration unit 107 restores the embedded information from the detected background pattern. Accordingly, CPU 101 obtains the password, the copy conditions, and the rank information, which are included in the information embedded in the document as a background pattern.

In step S205, CPU 101 displays a password entry screen on touch panel 71 of operation panel 70 and accepts input of a password. If the password entered in step S205 matches the password included in the embedded information restored in step S204 (YES in step S205), a process for deciding copy conditions as shown in FIG. 7 is executed. If the password entered in step S205 does not match (NO in step S205) and if retry is made (YES in step S207), CPU 101 accepts input of a password again in step S205. If no retry is made (NO in step S207), CPU 101 ends the user mode without performing the subsequent process and allows the user to log out (step S219).

If no password is included in the restored embedded information, the above-mentioned steps S205, S206, S208 are skipped, and a process for deciding copy conditions may be executed.

If a background pattern is not detected from the image data scanned in step S202 (NO in step S203), in step S218, the image data scanned in step S202 is printed under the copy conditions set and input in step S201, whereby the document is copied.

If the password entered in step S205 matches the password included in the embedded information restored in step S204 (YES in step S205), the process in FIG. 7 is performed. More specifically, in step S207, CPU 101 extracts the machine set conditions, the machine input conditions, and the user conditions. The machine set conditions correspond to the output conditions depending on the machine-part conditions obtained from signals from sensors in MFP 1 or information stored in HDD 120, including, for example, only black-and-white output due to a trouble or limitations of kind or size of paper due to paper-out. The machine input conditions correspond to the copy functions set and input by the user as accepted in step S201. The user conditions correspond to the output conditions depending on the function limitation set for the user authenticated in step S200.

When these conditions are extracted, in the subsequent process, decision unit 111 decides the copy conditions as the output conditions for copying the document, considering the priority for each of the embedded conditions, the machine set conditions, the machine input conditions, and the user conditions that are the copy conditions included in the embedded information and are set for each item as shown in FIG. 8 according to the rank information included in the embedded information.

Specifically, CPU 101 specifies the number of items N of the copy conditions included in the embedded conditions in step S300 and sets N as the upper limit value of a variable n in step S301. CPU 101 initializes variable n in step S302 and thereafter increments variable n by one in step S303.

Decision unit 111 refers to the rank information included in the embedded information for the item corresponding to variable n and decides on, as the copy condition for the item corresponding to variable n, the condition having a higher priority among the embedded condition, the machine set condition, the machine input condition, and the user condition that are the copy conditions included in the embedded information, according to the rank information. In other words, if the embedded condition has a higher priority than the machine set condition and the machine input condition, in the rank information (YES in step S304), decision unit 111 decides on the embedded condition as the copy condition for item n, in step S305. If the user condition has a higher priority than the machine set condition (NO in step S304 and YES in step S306), decision unit 111 decides on the user condition as the copy condition for item n, in step S307. If the machine set condition has a higher priority than the machine input condition (NO in step S304, NO in step S306, and YES in step S308), decision unit 111 decides on the machine set condition as the copy condition for item n, in step S309. If the machine input condition has a higher priority than the machine set condition (NO in step S304, NO in step S306, and NO in step S308), decision unit 111 decides on the machine input condition as the copy condition for item n, in step S311.

The process described above is repeated until variable n reaches upper limit value N (YES in step S311), so that the copy conditions for all the items are decided on by decision unit 111.

Returning to FIG. 6, in step S217, CPU 101 generates a control signal for executing printing under the copy condition decided for each item in the process above and outputs the control signal to formation unit 30, Accordingly, the document is copied under the decided copy conditions in formation unit 30. Upon completion of copying, in step S219, CPU 101 ends the user mode and allows the user to log out.

The foregoing decision of the copy conditions in MFP 1 will be described with reference to specific examples shown in FIG. 9 to FIG. 12.

Figure 9:
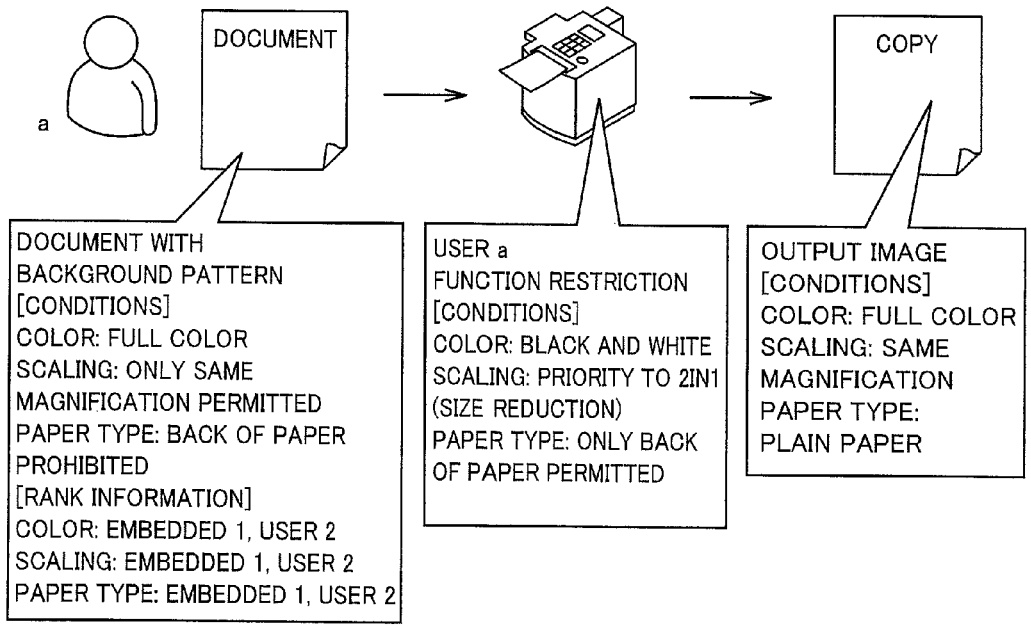
FIG. 9 to FIG. 12 illustrate decision of copy conditions in MFP.

In an example shown in FIG. 9, the embedded conditions of a document are: that full color is permitted in the item of color; that only the same magnification is permitted in the item of magnification; and that the back of paper is prohibited in the item of paper type. According to the embedded rank conditions, the embedded condition has the first priority and the user condition has the second priority for the item of color, the embedded condition has the first priority and the user condition has the second priority also for the item of magnification, and the embedded condition has the first priority and the user condition has the second priority also for the item of paper type. As the user conditions for a user a who has logged in, it is set that black-and-white is permitted in the item of color, 2in1 scaling is given priority for the item of magnification, and only the back of paper is permitted for the item of paper type.

In the case of the example in FIG. 9, decision unit 111 decides on the same conditions as the embedded conditions, namely, full color for the item of color, the same magnification for the magnification item, and plain paper for the paper type, as the copy conditions of the document, because the embedded conditions have the higher priority for all the items according to the rank information.

Figure 10:
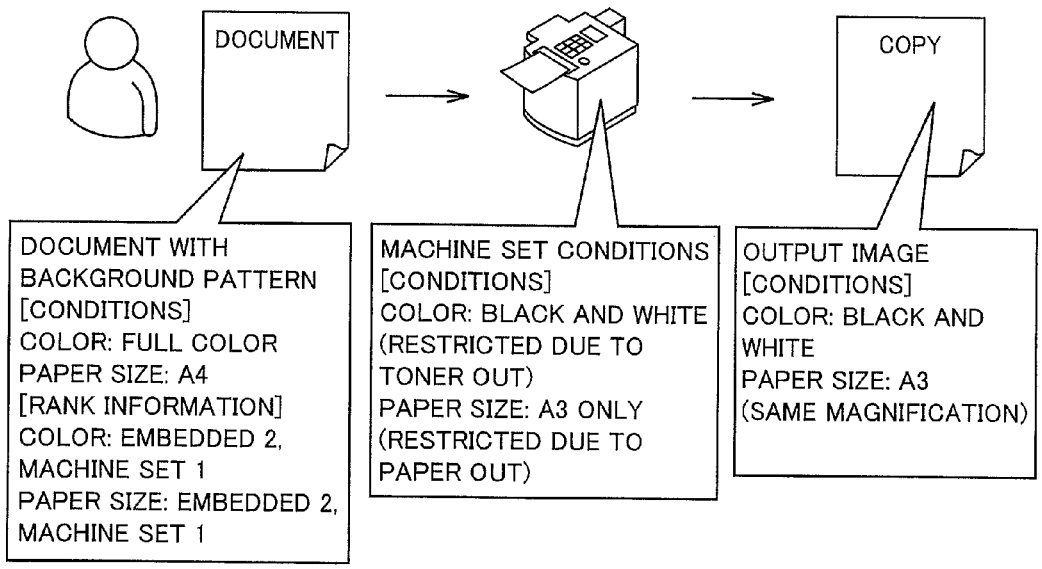

In an example shown in FIG. 10, the embedded conditions of a document are: that full color is permitted for the item of color; and A4 size for the item of paper size. According to the embedded rank conditions, the embedded condition has the second priority and the machine set condition has the first priority for the item of color, and the embedded condition has the second priority and the machine set condition has the first priority also for the item of paper size, In MFP 1, toner-out only permits printing exclusively in black-and-white and paper-out only permits printing exclusively in A3 size. At that time, the resulting machine set conditions are black-and-white only for the item of color and only A3 size permitted for the item of paper size.

In the case of the example in FIG. 10, decision unit 111 decides on the same conditions as the machine set conditions, namely, black-and-white for the item of color and A3 for the item of paper size, as the copy conditions of the document, because the machine set conditions have the higher priority for both items according to the rank information.

Figure 11:
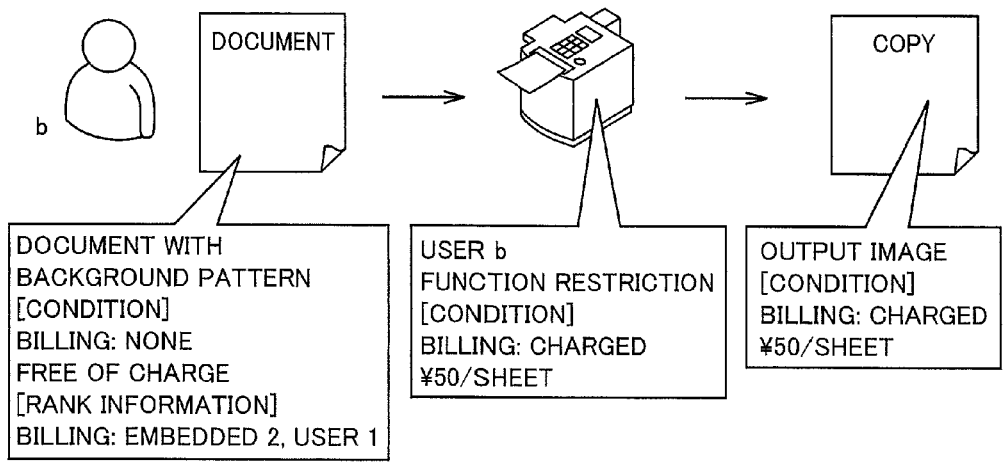

In an example shown in FIG. 11, the embedded condition of a document is charge-free for the item of billing. According to the embedded rank condition, for the item of billing, the embedded condition has the second priority and the user condition has the first priority. As the user condition for a user b who has logged in, it is set that 50 yen per sheet is charged for the item of billing.

In the case of the example in FIG. 11, decision unit 111 decides on the same copy condition as the user condition, namely, charging 50 yen per sheet, as the copy condition of the document, because the user condition has the higher priority for the item of billing according to the rank information.

Figure 12:
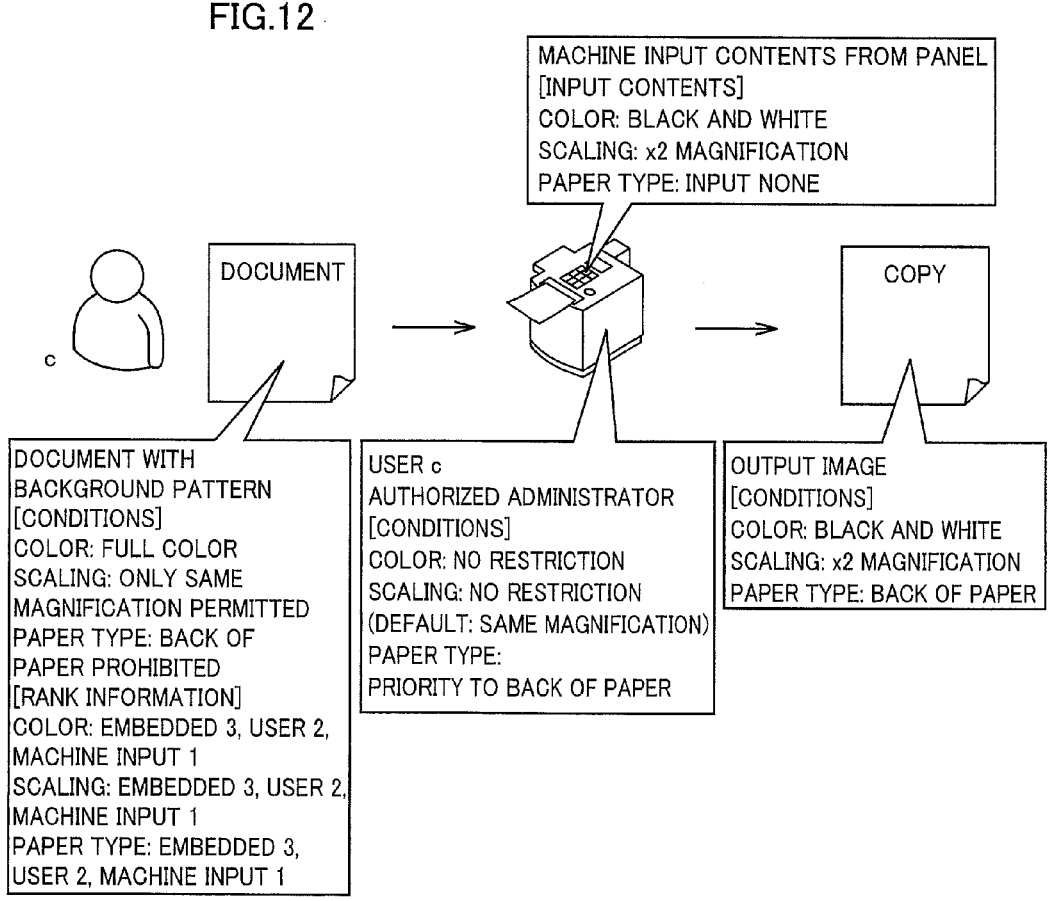

In an example shown in FIG. 12, the embedded conditions of a document are: that full color is permitted in the item of color; that only the same magnification is permitted in the item of magnification; and that the back of paper is prohibited in the item of paper type. According to the embedded rank conditions, the embedded condition has the third priority, the user condition has the second priority, and the machine input condition has the first priority for the item of color, the embedded condition has the third priority, the user condition has the second priority, and the machine input condition has the first priority also for the item of magnification, and the embedded condition has the third priority, the user condition has the second priority, and the machine input condition has the first priority also for the item of paper type. As the user conditions for a user c who has logged in, no restriction is set for the item of color, no restriction is set for the magnification item either, and it is set that the back of paper is given priority for the item of paper type. Furthermore, in MFP 1, black-and-white and ×2 magnification printing are designated as the copy conditions and no paper type is designated on touch panel 71 of operation panel 70. At that time, the resulting machine input conditions are black-and-white for the item of color, ×2 magnification for the magnification item, and no designation for the item of paper type.

In the case of the example in FIG. 12, decision unit 111 decides on the same conditions as the machine input conditions, namely, black-and-white and ×2 magnification, as the copy conditions of the document for the item of color and the item of magnification, because the machine input conditions have the higher priority for both items according to the rank information. Decision unit 111 also decides on the same condition as the user condition, namely, the back of paper, which is the next higher priority, for the item of paper size, because the machine input condition designates nothing.

The process of printing a document as described above is performed in MFP 1, so that the order of priority of the copy conditions is set according to the use or purpose of documents and situations. The foregoing copy process is then performed in MFP 1, so that copying is executed under the copy conditions according to the order of priority embedded in the document. Accordingly, the optimum output intended by a document writer can be obtained using MFP 1.

Although in the examples above, both of the processes of printing and copying a document are performed in MFP 1, a document may be printed in a first MFP and the document may be copied in a second MFP different from the first MFP.

Furthermore, in the examples above, the copy conditions are decided on based on the embedded order of priority in steps S300-S311 when a document is copied in MFP 1. However, the copy conditions may be decided on based on the user conditions, irrespective of the embedded order of priority, based on a prescribed signal. For example, when a user who has entered log-in information is authenticated as being a predetermined user set beforehand (for example, defined as having authority) or as belonging to a predetermined department, in the authentication process prior to step S200, the process for deciding the copy conditions in steps S300-S311 above are not performed, and the user conditions that are the copy conditions input through operation panel 70 of MFP 1 in step S201 may be decided on as the copy conditions. Alternatively, irrespective of the embedded order of priority, the order of priority may be overwritten so that the user condition has the first priority. In this manner, the intention of a copy executer precedes over that of a document writer as long as an operation is performed by a particular user such as a user who is an authorized administrator.

A program causing a computer to execute the processes in MFP 1 may also be provided. Such a program may be recorded in a computer readable recording medium such as a flexible disk, a CD-ROM (Compact Disk-Read Only Memory), a ROM, a RAM, and a memory card, which accompanies a computer, and may be provided as a program product. Alternatively, the program may be recorded in a recording medium such as a hard disk contained in a computer. Alternatively, the program may be downloaded via a network.

The program may allow the process to be executed by invoking necessary modules, among program modules provided as a part of Operation System (OS) of a computer, in a prescribed sequence at a prescribed timing. In this case, the aforementioned modules are not included in the program itself and the process is executed in cooperation with OS. The program may also include a program that does not include such modules.

Furthermore, the program may be built in a part of another program. In this case, the modules included in another program are not included in the program itself, and the process is executed in cooperation with another program. The program may also include such a program built in another program.

The program product to be provided is installed in a program storage unit such as a hard disk for execution. It is noted that the program product includes the program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
a scanner for optically scanning a first document to obtain image data;
an output device for outputting a printed material based on said image data;
an input device for accepting a first copy condition for copying said printed material as a second document and a second copy condition, said second copy condition being specified in another image forming apparatus, and for accepting an order of priority for said first copy condition and said second copy condition for said second document, said first copy condition having a different priority than said second copy condition; and
a controller configured to control said image forming apparatus for
i) generating a background pattern based on said first copy condition and said order of priority; and
ii) combining said image data obtained from said first document with said background pattern,
wherein said output device outputs said image data combined with said background pattern, as said printed material.

2. The image forming apparatus according to claim 1, wherein said second copy condition includes at least one of a copy condition set in an image forming apparatus that copies said printed material output based on said first document as said second document and a copy condition set for a user who copies said printed material.

3. The image forming apparatus according to claim 1, wherein
said first copy condition includes a plurality of items,
said input device accepts a setting of a copy condition for at least one of said plurality of items, and a setting of said order of priority for each of said plurality of items.

4. An image forming apparatus comprising:
a scanner optically scanning a document to obtain image data;
an output device performing an image forming process based on said image data for output; and
a controller configured to control said image forming apparatus for i) detecting a background pattern from said image data;
ii) restoring embedded information from said background pattern;
iii) specifying as a second copy condition a copy condition set on the part of said image forming apparatus; and
iv) obtaining, from said restored embedded information, a first copy condition set for said document as a condition in copying said document and an order of priority between said first copy condition and said second copy condition for deciding a copy condition of said document, to decide on one of said first copy condition and said second copy condition as a condition for outputting said image data in said output device, based on said order of priority.

5. The image forming apparatus according to claim 4, further comprising:
an input device for accepting a setting of a condition for outputting said image data in said output device, wherein
said controller further controls said image forming apparatus for
v) specifying an output condition based on a function of the image forming apparatus;
vi) authenticating a user who gives an instruction to output said image data; and
vii) specifying an output condition defined beforehand for said authenticated user, and
said second copy condition includes at least one of the condition accepted by said input device and the condition specified by said image forming apparatus.

6. The image forming apparatus according to claim 4, wherein
said first copy condition and said second copy condition each include a plurality of items,
said order of priority is the order of priority for each of said plurality of items, and
said controller controls said image forming apparatus for deciding a condition for outputting said image data in said output device, based on said order of priority, for each of said plurality of items.

7. The image forming apparatus according to claim 4, wherein:
said input device further accepts a setting of a condition for outputting said image data in said output device; and
said controller controls said image forming apparatus for
authenticating a user who gives an instruction to output said image data; and
giving priority to the condition accepted by said input device to decide a condition for outputting said image data in said output device, irrespective of said order of priority, when said authenticated user is a particular user.

8. An image forming apparatus comprising:
a scanner optically scanning a document to obtain image data;
an output device for outputting a printed material based on said image data;
an input device for accepting a first copy condition, when a printed material is output based on image data obtained by scanning a first document through said scanner, said first copy condition being a copy condition for copying said printed material as a second document, and accepting an order of priority as a copy condition of said second document between said first copy condition and a second copy condition, said second copy condition being specified in said image forming apparatus to make a copy of said second document; and
a controller configured to control said image forming apparatus for
i) generating a background pattern based on said first copy condition and said order of priority;

ii) combining said first image data with said background pattern;
iii) detecting the combined background pattern from the image data obtained by said scanner;
iv) restoring embedded information from the background pattern;
v) specifying a copy condition set on the part of said image forming apparatus, as said second copy condition; and
vi) obtaining said first copy condition and said order of priority from said embedded information restored from said background pattern detected from second image data obtained by said scanner by scanning said second document that is a printed material output based on said first image data combined with said background pattern, to decide on one of said first copy condition and said second copy condition as a condition for outputting said image data in said output device, based on said order of priority.

9. An image forming method comprising the steps of:
accepting a setting of a first copy condition as a copy condition in copying a second document that is a printed material output based on image data obtained by scanning a first document;
accepting a setting of an order of priority between said first copy condition and a second copy condition specified in an image forming apparatus that makes a copy of said second document, said first copy condition having a different priority than said second copy condition, for deciding a copy condition of said second document;
obtaining image data by optically scanning said first document;
generating a background pattern based on said first copy condition and said order of priority;
combining said image data with said background pattern; and
outputting said image data combined with said background pattern.

10. The image forming method according to claim 9, wherein said second copy condition includes at least one of a copy condition set in an image forming apparatus that copies said second document and a copy condition set for a user who copies said second document.

11. The image forming method according to claim 9, wherein
said first copy condition includes a plurality of items,
in said step of accepting a setting of the first copy condition, a setting of a copy condition for at least one of said plurality of items is accepted, and
in said step of accepting an order of priority, a setting of said order of priority is accepted for each of said plurality of items.

12. An image forming method in an image forming apparatus, comprising the steps of:
obtaining image data by optically scanning a document;
detecting a background pattern from said image data;
restoring embedded information from said background pattern to obtain a first copy condition set for said document as a condition in copying said document and an order of priority between said first copy condition and a second copy condition set on the part of said image forming apparatus for deciding a copy condition of said document from said embedded information; and
deciding on one of said first copy condition and said second copy condition as a condition for outputting said image data, based on said order of priority.

13. The image forming method according to claim 12, further comprising the step of accepting a setting of a condition for outputting said image data in said image forming apparatus,
wherein said second copy condition includes at least one of an output condition accepted in said step of accepting a setting of a condition for outputting said image data, an output condition specified based on a function of said image forming apparatus, and an output condition defined beforehand for a user who gives an instruction to output said image data.

14. The image forming method according to claim 12, wherein
said first copy condition and said second copy condition each include a plurality of items,
said order of priority is an order of priority for each of said plurality of items, and
in said step of deciding a condition for outputting said image data, a condition for outputting said image data is decided based on said order of priority, for each of said plurality of items.

15. The image forming method according to claim 12, further comprising the step of accepting a setting of a condition for outputting said image data in said image forming apparatus,
wherein in said step of deciding a condition for outputting said image data, when a user who gives an instruction to output said image data is a particular user, a condition in outputting said image data is decided by giving priority to a copy condition accepted in the step of accepting a setting of a condition for outputting said image data, irrespective of said order of priority.

16. An image forming method in a system configured to include at least one image forming apparatus, comprising the steps of:
accepting a setting of a first copy condition as a copy condition for copying a second document that is a printed material output based on image data obtained by scanning a first document;
accepting a setting of an order of priority between said first copy condition and a second copy condition specified in an image forming apparatus that makes a copy of said second document, for deciding a copy condition of said second document;
obtaining first image data by optically scanning said first document;
generating a background pattern based on said first copy condition and said order of priority;
combining said first image data with said background pattern;
outputting said first image data combined with said background pattern;
obtaining second image data by optically scanning said second document that is a printed material output based on said first image data combined with said background pattern;
detecting said background pattern from said second image data;
restoring embedded information from said background pattern to obtain said first copy condition and said order of priority; and
deciding on, as a condition for outputting said second image data, one of said first copy condition and said second copy condition set on the part of the image forming apparatus that copies said second document, based on said order of priority.

* * * * *